United States Patent [19]

Hughey

[11] Patent Number: 4,745,520
[45] Date of Patent: May 17, 1988

[54] POWER SUPPLY

[75] Inventor: Daniel C. Hughey, Indianapolis, Ind.

[73] Assignee: Ransburg Corporation, Indianapolis, Ind.

[21] Appl. No.: 917,702

[22] Filed: Oct. 10, 1986

[51] Int. Cl.⁴ .......................... H02H 3/08; B05B 5/00
[52] U.S. Cl. .................................... 361/228; 361/235; 118/621; 239/690
[58] Field of Search ...................... 361/227, 228, 235; 118/621, 626, 665, 671; 333/112, 118; 239/690–708

[56] References Cited

U.S. PATENT DOCUMENTS

| 2,302,185 | 11/1942 | Campbell, Jr. | 361/227 |
| 2,302,289 | 11/1942 | Bramston-Cook | 361/227 |
| 2,509,277 | 5/1950 | Ransburg et al. | 118/621 |
| 2,650,329 | 8/1953 | Orndoff | 361/112 |
| 2,881,092 | 4/1959 | Sedlacsik, Jr. | 118/621 |
| 3,048,498 | 8/1962 | Juvinall et al. | 361/228 |
| 3,273,015 | 9/1966 | Fischer | 361/227 |
| 3,367,578 | 2/1968 | Juvinall et al. | 239/705 |
| 3,567,996 | 3/1971 | Gordon | 361/235 |
| 3,599,038 | 8/1971 | Skidmore | 118/621 |
| 3,608,823 | 9/1971 | Buschor | 239/705 |
| 3,641,971 | 2/1972 | Walberg | 361/228 |
| 3,731,145 | 5/1973 | Senay | 361/227 |
| 3,851,618 | 12/1974 | Bentley | 361/86 X |
| 3,875,892 | 4/1975 | Gregg et al. | 118/621 X |
| 3,893,006 | 7/1975 | Algeri et al. | 361/227 |
| 3,894,272 | 7/1975 | Bentley | 361/227 |
| 3,895,262 | 7/1975 | Ribnitz | 361/227 |
| 4,075,677 | 2/1978 | Bentley | 361/235 |
| 4,120,015 | 10/1978 | Haller | 361/227 |
| 4,165,022 | 8/1979 | Bentley et al. | 361/225 |
| 4,187,527 | 2/1980 | Bentley | 361/235 |
| 4,213,167 | 7/1980 | Cumming et al. | 361/213 |
| 4,331,298 | 5/1982 | Bentley et al. | 239/690 |
| 4,402,030 | 8/1983 | Moser et al. | 361/235 X |
| 4,485,427 | 11/1984 | Woodruff et al. | 361/235 |
| 4,652,318 | 3/1987 | Masuda et al. | 250/324 |

FOREIGN PATENT DOCUMENTS

| 720418 | 12/1954 | United Kingdom . |
| 1387632 | 3/1975 | United Kingdom . |
| 2077006 | 12/1981 | United Kingdom . |

Primary Examiner—L. T. Hix
Assistant Examiner—D. Rutledge
Attorney, Agent, or Firm—Barnes & Thornburg

[57] ABSTRACT

An electrostatically aided coating dispensing system in which the high distributed capacitance of a high voltage cable for connecting the high voltage supply to dispensing device is entirely eliminated.

36 Claims, 3 Drawing Sheets

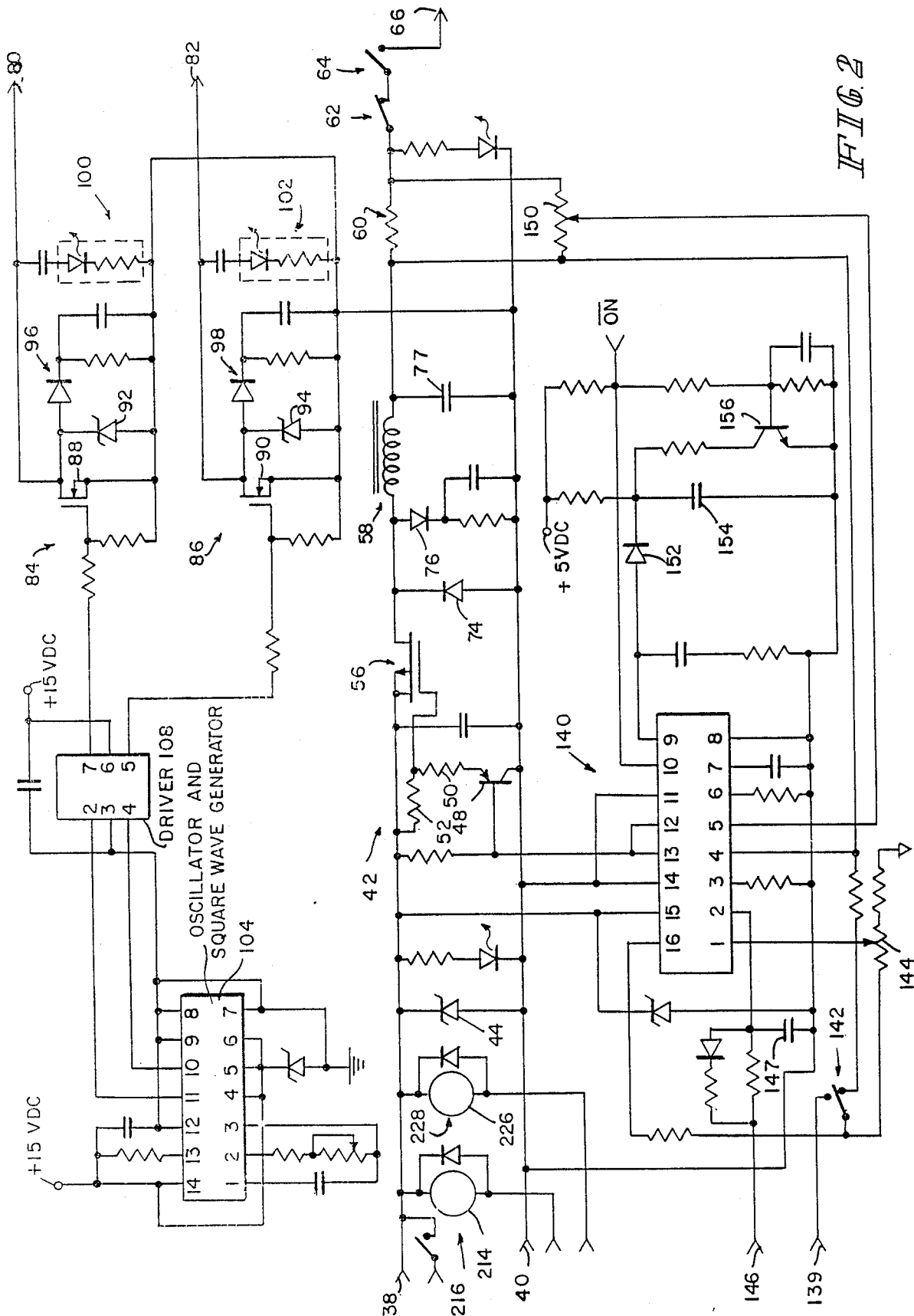

POWER SUPPLY

This invention relates to electrical circuits for generating high magnitude electrostatic potentials. The invention is disclosed in the context of high-magnitude electrostatic potential generating systems for use in electrostatically aided coating material application systems, such as liquid painting and powder coating systems. However, the system is believed to have utility elsewhere as well.

Several mechanism are known for protecting high voltage generating- and coating material dispensing systems from spark discharges. There are, for example, the systems described in U.S. Pat. Nos. 3,851,618; 3,875,892; 3,894,272; 4,075,677; 4,187,527; 4,402,030; and 4,485,427. All of these systems contemplate the inclusion of high voltage cables which connect their respective high potential supply terminals to a dispensing device. See, for example, high voltage cable 15 in U.S. Pat. Nos. 3,875,892, high voltage cable 113 in 4,402,030, and resistance 202 in 4,485,427.

Generally, these references contemplate that under conditions which indicate that a high voltage spark is imminent, the high voltage supply will be disconnected from the high voltage cable and/or the high voltage cable and dispensing device will be shorted to ground to remove from them the high voltage, sparking of which is threatened. See, for example, in U.S. Pat. Nos. switch 13 in 3,875,892, switch 36 in 4,075,677 and 4,187,527, and switches 33, 115, 116 and 117 in 4,402,030.

In some of these references, other mechanisms are employed in place of, or in addition to, grounding of the high voltage cable or dispensing device and/or disconnecting of the high voltage supply from the high voltage cable and/or dispensing device. In U.S. Pat. No. 4,402,030, for example, the supply of operating potential to the high voltage supply is disrupted. See switch 16 in U.S. Pat. No. 4,402,030. In U.S. Pat. No. 4,485,427, rather than disconnecting the high voltage supply from the high voltage cable and/or dispensing device, the voltage provided by the high voltage supply is degraded to some lower-magnitude voltage through a "foldback" current-voltage characteristic. As the current supplied by the high voltage supply in U.S. Pat. No. 4,485,427 approaches a level at which the possibility of sparking becomes sufficiently great, the voltage is automatically reduced by the regulating action of the supply itself to some lower magnitude to reduce that possibility.

However all of these types of systems contemplate the use of high voltage cables having relatively large distributed capacitances and resistances to connect their high voltage supplies to their dispensing devices. Their supplies also typically have relatively large output resistances and capacitances. The output resistances and capacitances of prior art systems might range in the tens of megohms and hundreds or thousands of picofarads, respectively. The capacitances contributed to the prior art systems by their high voltage cables vary depending upon the length of cable used in a particular system, but figures in the hundreds or thousands of picofarads capacitance are fairly representative of high voltage cable/dispensing device input capacitance. These figures make charging and discharging time constants quite large. As a result, low impedance switches typically must be employed either across the output terminals of the high voltage supply, or across the coating dispensing device to ground, or both, in order to discharge the built-up high potential across these components to the greatest extent possible in the event a high voltage spark becomes likely. See, for example, switches 115-117 of U.S. Pat. No. 4,402,030.

It is an object of the present invention to provide an electrostatically aided coating dispensing system in which the high resistance and high capacitance in the high voltage generator output, dispensing device, and connection between these two is effectively eliminated.

It is an object of the present invention to provide an electrostatically aided coating dispensing system in which the high distributed capacitance of a high voltage cable for connecting the high voltage supply to the dispensing device is entirely eliminated.

It is an object of the present invention to provide a high potential supply which can be charged and discharged relatively quickly and easily, so that the prior art mechanical high-voltage switch for discharging the system's coating material dispensing device can be eliminated from the system. This results in the system being able to respond much more rapidly to a signal which indicates that a high-potential spark is about to occur, while at the same time making the system less expensive through the elimination of the prior art mechanical high-voltage switch. In a prior art supply, capacitor values typically resulted in long discharge time constants across the supply output terminals. Capacitance values in the range of 2000-3000 picofarads are not uncommon in the prior art. On the other hand, capacitance values across the high potential output terminals of a coating dispensing system according to the present invention of 10-20 picofarads are contemplated. This alone yields a reduction in the discharging time constant of the supply in the range of 2 orders of magnitude and more. This considerable reduction in the discharging time constant of the supply makes it possible to reduce the potential across the high magnitude potential output terminals of the supply to a level below that at which a spark will occur without the need for a cumbersome, expensive mechanical shorting switch.

It is an object of the invention to provide a signal processing system in which high potential supply output current in a passband of frequencies controls the potential available across the high potential supply output terminals.

According to one aspect of the invention, a high magnitude electrostatic potential supply and an electrostatic potential utilization device are provided with means for coupling the electrostatic potential supply to the utilization device. The coupling means consists essentially of a conductor having substantially no distributed capacitance and substantially no distributed resistance, or of a discrete number of lumped (i,e., not distributed) resistors and a discrete number of such conductors for connecting the resistors together in a network, and for connecting the network to the electrostatic potential supply and to the utilization device.

Additionally according to this aspect of the invention, the electrostatic potential supply comprises an operating potential source, a transformer having a primary winding and a secondary winding, a high potential rectifier and multiplier, means for coupling the operating potential source to the primary and means for coupling the secondary to the rectifier and multiplier, and the means for coupling the electrostatic potential supply to the utilization device consists essentially of the conductor or of the discrete number of lumped resistors and the discrete number of conductors for coupling the rectifier and multiplier to the utilization device. The means for coupling the operating potential source to the primary comprises a regulator for providing regulated operating voltage and means for switching the regulated operating voltage across the primary.

Further according to this aspect of the invention, a resistive voltage divider is provided along with means for coupling the resistive voltage divider across the rectifier and multiplier, and means for coupling a portion of the resistive voltage divider to the regulator to provide to the regulator a signal against which the operating potential is regulated.

Additionally according to this aspect of the invention, current sensing means are provided, along with means for coupling the current sensing means in series with the regulator. The current sensed by the current sensing means controls the current passed through the regulator from the operating potential source to the primary. Second current sensing means are also provided, the second current sensing means comprising a portion of the resistive voltage divider. A bandpass filter is also provided, along with means for coupling the second current sensing means to the bandpass filter, signal processing circuitry, means for coupling the bandpass filter to the signal processing circuitry, and means for coupling the signal processing circuitry to the operating potential source. The current sensed by the second current sensing means controls the supply of operating potential by the operating potential source.

Illustratively the utilization device comprises a device for dispensing coating material. In the illustrated embodiment, the coating material is a liquid and the dispensing device further comprises means for atomizing the coating material.

In the illustrative embodiment, the conductors connect the resistors together in a series string of resistors and connect the series string between the high potential supply and the utilization device.

A combination according to another aspect of the invention includes a high magnitude electrostatic potential supply, an electrostatic potential utilization device and means for coupling the supply to the utilization device. The electrostatic potential supply includes a source of operating potential, means for generating high magnitude electrostatic potential from the operating potential, and means for coupling the operating potential source to the high magnitude electrostatic potential generator. Means are provided for sensing the output current from the electrostatic potential supply, and for coupling the current sensing means to the electrostatic potential supply. The system includes a bandpass filter, means for coupling the current sensing means to the bandpass filter, signal processing means, means for coupling the bandpass filter to the signal processing means, and means for coupling the signal processing means to the operating potential source. The sensed current controls the supply of operating potential by the operating potential source.

Illustratively according to this aspect of the invention, the means for generating high magnitude electrostatic potential comprises a pair of output terminals, and the output current sensing means comprises a resistive voltage divider and means for coupling the voltage divider across the output terminals. The output current is sensed across a portion of the resistive voltage divider.

Illustratively, the means for coupling the supply to the utilization device consists essentially of a discrete number of lumped resistors and a discrete number of conductors for connecting the resistors together in a network, and for connecting the network to the electrostatic potential supply and to the utilization device. The conductors connect the resistors together in a series string of resistors and connect the series string between the high potential supply and the utilization device.

The invention may best be understood by referring to the following description and accompanying drawings which illustrate the invention. In the drawings:

FIG. 2 illustrates a partly block and partly schematic diagram of part of a system constructed according to the present invention;

FIG. 3b illustrates a partly block and partly schematic diagram of an alternative to the part of the system illustrated in FIG. 3a.

Figure 1:
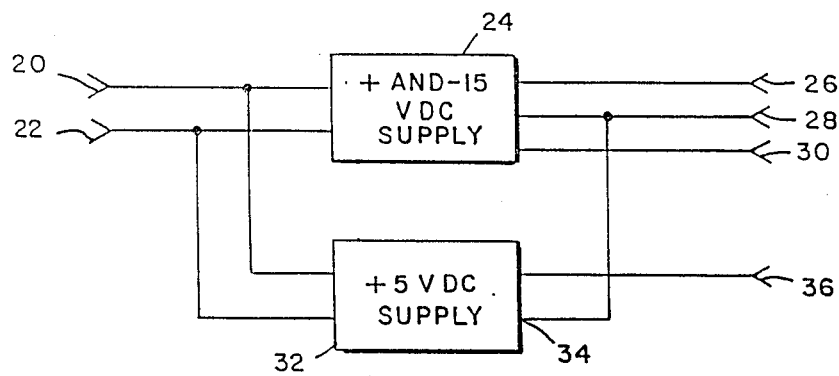
FIG. 1 illustrates a partly block and partly schematic diagram of part of a system constructed according to the present invention.

In FIG. 1, 115 VAC line voltage is provided across terminals 20, 22. This voltage is supplied across the input terminals of a + and −15 VDC supply 24 such as the Accopian type D15-15A integrated circuit converter. +15 VDC is provided across terminals 26, 28. −15 VDC is provided across terminals 30, 28. The 115 VAC line supply is also coupled across the input terminals of a +5 VDC supply 32 such as the Accopian type 5E25 integrated circuit converter. The −output terminal 34 of supply 32 is coupled to terminal 28 of supply 24. +5 VDC appears across terminals 36, 34 of supply 32.

Referring now to FIG. 2, unregulated +24 VDC is supplied across input terminals 38, 40 of a series regulator circuit 42. Circuit 42 includes a 43 volt zener diode 44, the cathode of which is coupled to terminal 38 and the anode of which is coupled to terminal 40. A series 2.7 K resistor and LED are in parallel with zener diode 43. Illumination of the LED indicates that unregulated +24 VDC is available. An 820 ohm, ½ watt resistor is coupled between terminal 38 and the base of a transistor 48, such as the type 2N5400. The emitter of transistor 48 is coupled through series resistors 50, 52 to terminal 38. Resistors 50, 52 are a 270 ohm, 1 watt resistor and a 130 ohm, 1 watt resistor, respectively. The collector of transistor 48 is coupled to terminal 40. A 47 uF capacitor is coupled across terminals 38, 40.

The junction of resistors 50, 52 is coupled to the gate electrode of an FET 56 such as the International Rectifier type IRF 9530. The drain electrode of FET 56 is coupled to terminal 38. The source electrode of FET 56 is coupled through a 1 mH choke 58, a 0.5 ohm current monitoring resistor 60, a normally closed switch 62 and a normally open switch 64 to the center tap 66 of the primary winding 70 (FIG. 3) of a high voltage transformer 72. The cathode of a flyback diode 74 is coupled to the source of FET 56. Its anode is coupled to terminal 40. A damping circuit includes a diode 76, the anode of which is coupled to the source of FET 56 and the cathode of which is coupled to a common terminal of an RC parallel circuit including a 10K resistor and a 0.001 uF capacitor. The other terminal of this RC parallel circuit is coupled to terminal 40. A 47 uF capacitor 77 is coupled between the common terminal of choke 58 and resistor 60 and terminal 40.

The series combination of a 2.2K resistor and an LED is coupled between the common terminal of resistor 60 and switch 62 and terminal 40. Illumination of this LED indicates voltage is being provided to center tap 66.

The end terminals 80, 82 of primary winding 70 (FIG. 3a) are coupled to respective switching circuits 84, 86. Terminals 80, 82 are coupled to the drain electrodes of respective FETs 88, 90 in circuits 84, 86. FETs 88, 90 illustratively are International Rectifier type IRF 530 FETs. The sources of FETs 88, 90 are coupled to terminal 40. The cathode of a 56 volt zener diode 92, 94 is coupled to the drain of FET 88, 90, respectively. Its anode is coupled to the source of FET 88, 90 respectively. A switch damper circuit 96, 98 is coupled in parallel with zener diode 92, 94, respectively. Each damper circuit 96, 98 includes a diode, the anode of which is coupled to the cathode of the zener diode 92, 94, and the cathode of which is coupled to a common terminal of an RC parallel circuit including a 1.5K, ½ watt resistor and a 0.1 uF capacitor. The other common terminal of each of these RC parallel circuits is coupled to the source of its respective FET 88, 90. The presence of AC on end terminals 80, 82 is indicated by circuits 100, 102, each including a 10 uF capacitor, an LED and a resistor in series between the respective terminal 80, 82 and terminal 40.

The drive signal for FETs 88, 90 is provided by an oscillator and square wave generator integrated circuit 104. Circuit 104 illustratively is an RCA type CD4047 CMOS monostable multivibrator. The pin numbers illustrated in the drawing are those applicable when this particular integrated circuit is employed for this purpose. This convention will be used when referring to the various integrated circuits described throughout this detailed description. It should be understood that other integrated circuits can be employed for the purposes for which the various integrated circuits described herein are used.

The frequency of oscillation of circuit 104 is established by the circuit on pins 1–3 of circuit 104. This circuit includes a 0.001 uF capacitor between pins 1 and 3 and the series combination of a 13.3K resistor and a 20K potentiometer between pins 2 and 3. Adjustment of the potentiometer shifts the frequency of the oscillations provided by circuit 104. Terminals 4, 5, 6 and 14 of circuit 104 are coupled between the +15 VDC supply and the cathode of a 16 volt zener diode, the anode of which is coupled to the common of the + and −15 VDC supply. Pins 7, 8, 9 and 12 of circuit 104 are coupled to the common. A 100K resistor and a 0.01 uF capacitor are coupled in series between pins 13 and 12 and their common terminal is coupled to the +15 VDC supply terminal. Pins 10 and 11 of circuit 104 provide oppositely-phased square waves at the frequency of oscillation to pins 4 and 2, respectively of a driver integrated circuit 108. Circuit 108 illustratively is a Teledyne type TSC426CPA integrated circuit. +15 VDC is coupled to pin 6 of circuit 108. Pin 3 of circuit 108 is coupled to the +15 VDC common. A 0.01 uF capacitor is coupled between pins 3 and 6. Pins 7 and 5 provide the output drive signals through respective 1K resistors to the gate electrodes of FETs 88, 90, respectively.

Figure 3B:
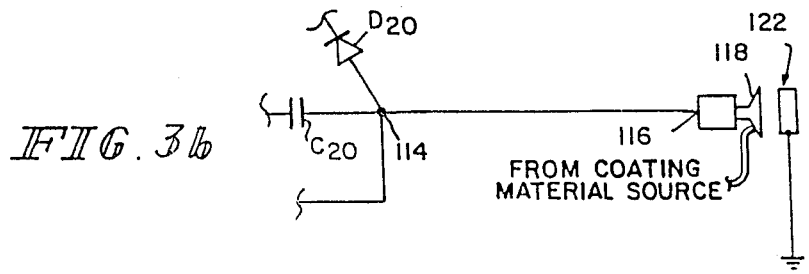
Figure 3A:
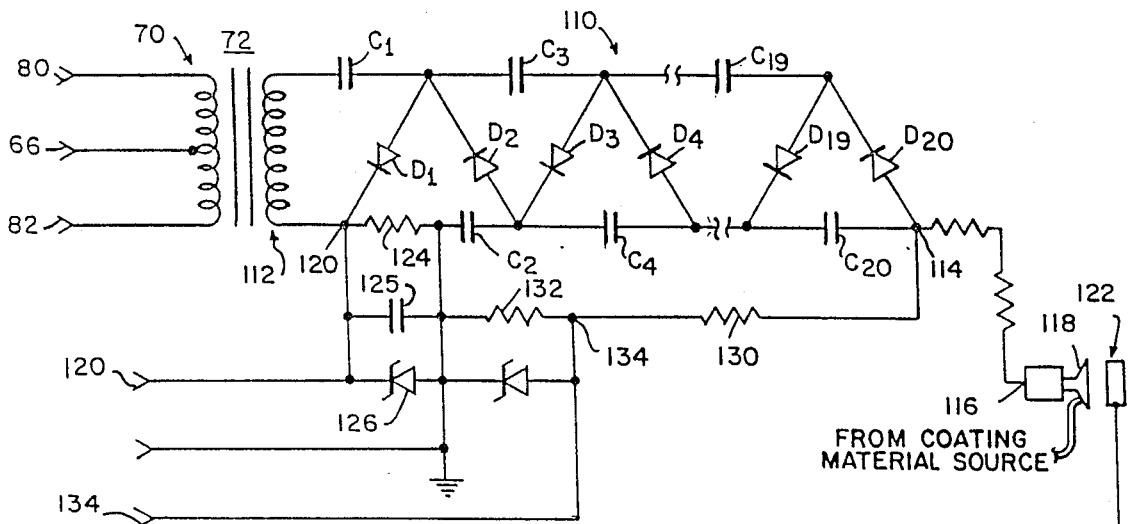
FIG. 3a illustrates a partly block and partly schematic diagram of part of a system constructed according to the present invention.

Referring now to FIG. 3a, a Cockcroft-Walton multiplier 110 including 470 pF capacitors $C_1$–$C_n$ and diodes $D_1$–$D_n$ is coupled across the secondary winding 112 of high voltage transformer 72. In the illustrated embodiment, n=20, although it is to be understood that other levels of multiplication can be employed, depending upon the needs of a particular application. Illustratively, diodes $D_1$–$D_n$ are type G20FS diodes available from High Voltage Components, 272 U.S. Highway 9, Howell, N.J. The junction of the anode of $D_n$ and $C_n$, terminal 114 forms one of the multiplier 110 output terminals and is coupled through two series 10 M resistors to some portion 116 of the coating material dispenser 118 into contact with which coating material comes as the coating material is atomized and dispensed by the coating material dispenser 118. As illustrated in FIG. 3b, the resistance between terminal 114 and terminal 116 can be eliminated, depending upon the needs of a particular installation.

In either case, the dispensed coating material is thus charged, in this case to a high-magnitude negative potential with respect to the remaining output terminal 120 of the multiplier 110. The target 122 onto which the charged coating material is intended to be dispensed is maintained at a potential at or very near the potential at terminal 120. In this case, the target 122 is maintained at ground potential. Terminal 120 of multiplier 110 is maintained very slightly above ground (about 0−+4.0 VDC or so) by a 20K resistor 124 in series between $C_2$ and terminal 120. A 0.47 uF capacitor 125 and a 10 volt zener diode 126 are coupled in parallel with resistor 124, with the cathode of zener diode 126 coupled to terminal 120 and its anode coupled to capacitor $C_2$. The anode of zener diode 126 is also coupled to ground. Thus the return path for current from terminal 114 is through the target 122 and the parallel circuit including resistor 124. A voltage signal which corresponds to the multiplier 110 output current thus appears across resistor 124 between ground and terminal 120.

In a high voltage supply, such as the one described in U.S. Pat. No. 4,485,427, the value of a capacitor in the location of capacitor 77 might be, for example 100 uF or more. The 47 uF capacitor 77 is an optimization of this component for the optimum discharge time of the dispensing device 118, coupled to the output terminal 114 of the multiplier 110.

A voltage signal which corresponds to the output voltage provided across terminals 114, 120 is provided by the series resistors 130, 132 and 124 coupled between these terminals. Resistor 130 has a resistance of 5 Gohms. Resistor 132 has a resistance of 249K. Compared to these values, the 20K resistance of resistor 124 is negligible. These resistors thus form a low current voltage divider and a bleed-off path for the potential across terminals 114, 120. Although the resistance of this path is high, because no high voltage cable is used to connect terminal 114 to the dispensing device 118, resistors 130, 132, 124 are adequate to dissipate a substantial amount of the charge stored on device 118 and its drive mechanism quickly. Additionally the effective output capacitance of the rectifier and multiplier is reduced considerably. Thus, the potential across terminals 114, 120 can be quickly dissipated by resistors 130, 132, 124. This effect is aided by the low capacitance (47 uF) of capacitor 77 in the series regulator 42 on the primary 70 side of high voltage transformer 72. This effect is also aided by the low capacitance provided by capacitors $C_1$–$C_n$ of multiplier 110.

The voltage across resistor 132 is approximately $5 \times 10^{-5}$ times the voltage across terminals 114, 120.

This scaled-down voltage is available across terminals 134 and ground. A 10 volt zener diode is coupled across terminals 134 and ground, with its anode coupled to terminal 134.

Figure 4:
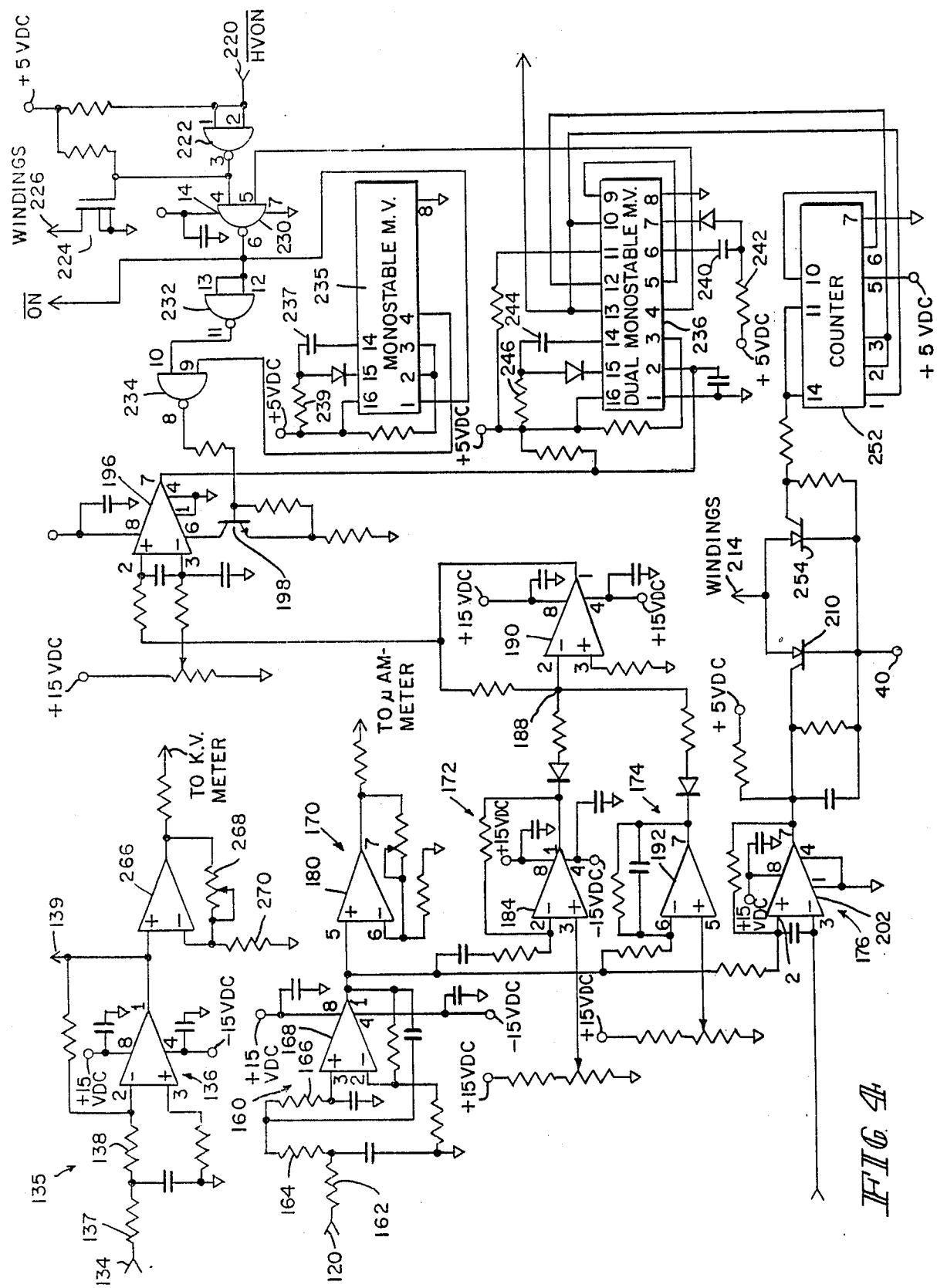
FIG. 4 illustrates a partly block and partly schematic diagram of part of a system constructed according to the present invention.

The voltage signal appearing across terminals 134 and ground regulates the DC voltage level supplied to the center tap 66 through the operation of a pulsewidth modulator integrated circuit 140 (FIG. 2), such as the Unitrode type UC3524A switching regulator integrated circuit. Terminal 134 is coupled to an amplifier circuit 135 (FIG. 4). Circuit 135 includes a difference amplifier 136. Terminal 134 is coupled through series 10K resistor 137 and 10 M resistor 138 to the −input terminal of amplifier 136. The common terminal of resistors 137, 138 is coupled through a 0.033 uF capacitor to ground. The +input terminal of amplifier 136 is coupled through a 3.9K resistor to ground. Feedback is supplied from the output terminal of amplifier 136 through an 18 M resistor to the −input terminal of amplifier 136. The output terminal of amplifier 136 is coupled to terminal 139 of FIG. 2, a stationary terminal of a switch 142. The other stationary terminal of switch 142 is coupled through a 5.6K resistor to pin 4 of circuit 140. The movable terminal of switch 142 is coupled through a series combination of a 20K potentiometer 144 and a 6.8K resistor to ground, and through a 100K pull-up resistor to pin 16 of circuit 140.

The wiper of potentiometer 144 is coupled to pin 1 of circuit 140. A 0–5 VDC "desired high voltage level" signal is provided, for example from a potentiometer on the power supply front panel or from a programmable controller, to a terminal 146. This signal is coupled through a 100K resistor to pin 2 of circuit 140. A 4.7 uF capacitor 147 is coupled across pin 2 and terminal 40. The anode of a diode 148, such as a type 1N914, is coupled to pin 2. The cathode of diode 148 is coupled through a 1K resistor to terminal 146. This permits the desired high voltage level across capacitor 147 to be reduced much more rapidly than it can be increased. In the position of switch 142 in which its movable terminal is connected to terminal 139, the high voltage feedback loop is closed and the circuit is in its normal operating configuration. In the other position of switch 142, the high voltage feedback loop is opened somewhat. This position is useful during setting up the circuit prior to placing it in operation.

Pin 3 of circuit 140 is coupled through a 2.2K resistor to terminal 40. Pin 5 of circuit 140 is coupled to the wiper of a current limiting potentiometer 150 which is coupled across current monitoring resistor 60. Pin 4 is coupled to the junction of choke 58 and resistor 60. Pin 6 is coupled through a 10K resistor to terminal 40. Pin 7 is coupled through a 0.002 uF capacitor to terminal 40. Pins 8, 11 and 14 are coupled directly to terminal 40. The series combination of a 10 uF capacitor and a 470 ohm resistor across pins 8, 9 establishes how rapidly circuit 140 will respond to changes in the signal at pin 1 of circuit 140.

The anode of a 1N914 diode 152 is also coupled to pin 9. The cathode of diode 152 is coupled through a 75K resistor to the +5 VDC supply terminal and to one terminal of a 68 uF capacitor 154, the other terminal of which is coupled to terminal 40. The cathode of diode 152 is also coupled through a series 1K resistor to the collector of a transistor 156, the emitter of which is coupled to terminal 40. The base of transistor 156 is coupled through a parallel RC circuit including a 10K resistor and a 200 pF capacitor to terminal 40, and through a 1K resistor to pin 10 of circuit 140. Pin 10 is also coupled through a 4.7K pull-up resistor to the +5 VDC supply terminal.

This circuit controls the rate of rise of the "high voltage error" signal on pin 9 of circuit 140 and reduces the possibility that the output high voltage across terminals 114, 120 (FIG. 3a) will overshoot the desired high voltage.

Pins 12 and 13 of circuit 140 are coupled to the base of transistor 48 and supply the width-modulated pulses from integrated circuit 140 through transistor 48 to series regulating FET 56. Pin 15 of circuit 140 is coupled to terminal 38 and to the cathode of a 43 volt zener diode, the anode of which is coupled to terminal 40.

Referring now to FIG. 4, the signal across resistor 124 of FIG. 3 is supplied from terminal 120 to a three-pole active low pass filter 160. Filter 160 includes three series 10K resistors 162, 164, 166 between terminal 120 and the +input terminal of a difference amplifier 168. A 0.033 uF capacitor is coupled between the junction of resistors 162, 164 and ground. A 0.068 uF capacitor is coupled between the output terminal of difference amplifier 168 and the junction of resistors 164, 166. A 0.001 uF capacitor is coupled between the +input terminal of difference amplifier 168 and ground. A 30K feedback resistor is coupled between the output terminal of difference amplifier 168 and its −input terminal and a 3 M resistor is coupled between its −input terminal and ground. The output signal from difference amplifier 168 is supplied to a current meter driver amplifier circuit 170, to a high pass filter circuit 172, and to two DC amplifier circuits 174, 176.

The output signal from difference amplifier 168 is coupled to the +input terminal of a buffer and level adjusting difference amplifier 180 in circuit 170. The −input terminal of difference amplifier 180 is coupled to ground through a 10K resistor and to its output terminal through a 50K feedback potentiometer. The output terminal of amplifier 180 is coupled through a 10K resistor to a current meter (not shown) to drive the current meter.

The output signal from difference amplifier 168 is coupled through a series RC circuit including a 0.22 uF capacitor and an 8.2K resistor to the −input terminal of a difference amplifier 184 in circuit 172. The output terminal of amplifier 184 is coupled through a 1 M feedback resistor to its −input terminal. The +input terminal of amplifier 184 is coupled to the wiper of a 10K potentiometer which is coupled in series with a 10K resistor across the +15 VDC supply terminals. The cathode of a 1N914 diode is coupled to the output terminal of amplifier 184 and its anode is coupled through a 3.9K resistor to a summing junction 188 at the −input terminal of a buffer difference amplifier 190.

The output terminal of amplifier 168 is coupled through a 47K resistor to the −input terminal of a difference amplifier 192 in circuit 174. The −input terminal of amplifier 192 is coupled through a parallel RC feedback circuit including a 3.9 M resistor and a 1 uF capacitor to its output terminal. The +input terminal of amplifier 192 is coupled to the wiper of a 50K potentiometer in series with a 100K potentiometer across the +15 VDC supply terminals. The output terminal of amplifier 192 is coupled to the cathode of a 1N914 diode, the anode of which is coupled through a 10K resistor to summing junction 188.

The output terminal of buffer amplifier 190 is coupled through a 10K feedback resistor to its −input terminal.

The +input terminal of amplifier 190 is coupled to ground through a 2.2K resistor. The output terminal of amplifier 190 is coupled through a 10K resistor to the +input terminal of a comparator difference amplifier 196. The −input terminal of comparator 196 is coupled through a 6.8K resistor to the wiper of a 50K potentiometer which is coupled across the +15 VDC supply. A 330 pF capacitor is coupled across the + and −input terminals of comparator 196. A 1 uF capacitor is coupled between the −input terminal of comparator 196 and ground. The output terminal of comparator 196 is coupled through a 4.7K resistor to the +5 VDC terminal. The collector of a transistor 198, such as a type 2N2222 transistor is coupled to the strobe input terminal of comparator 196. The emitter of transistor 198 is coupled through a series 1K resistor to ground. The base of transistor 198 is coupled through a 10K resistor to its emitter.

The output terminal of amplifier 168 is coupled through a 47K resistor to the +input terminal of a static overload DC amplifier 202 in circuit 176. The output terminal of amplifier 202 is coupled through a 2.2 M resistor to its +input terminal. The +input terminal of amplifier 202 is coupled to its −input terminal through a 0.01 uF capacitor. The −input terminal of amplifier 202 is coupled to a 0-5 VDC overload current setting potentiometer (not shown) on the system control panel.

Amplifiers 168, 180, 184, 190 and 192 illustratively are all National Semiconductor type LF442 integrated circuit difference amplifiers. Amplifiers 196 and 202 illustratively are National Semiconductor type LM311 or LF311 integrated circuit difference amplifiers.

The output terminal of amplifier 202 is coupled to the gate electrode of an SCR 210. The gate electrode of SCR 210 is coupled through a 1K resistor to the +5 VDC terminal and through a parallel RC circuit including a 470 ohm resistor and a 0.01 uF capacitor to terminal 40. The cathode of SCR 210 is coupled to terminal 40 and the anode of SCR 210 is coupled through the windings 214 of a relay 216 (see FIG. 2) to terminal 38. A flyback diode, such as the type 1N4004 is coupled across windings 214. Current flow through windings 214 opens switch 62.

A signal HVON (logic "true" indicates that no high voltage is available across terminals 114, 120 in FIG. 3a) is supplied to a terminal 220 of FIG. 4. Terminal 220 is coupled through a 4.7K resistor to the +5 VDC terminal and to both input terminals of a NAND gate 222 which functions as an inverter. The output terminal of NAND gate 222 is coupled to the gate of an FET 224 and through a 4.7K resistor to the +5 VDC supply. The source of FET 224 is coupled to ground. Its drain is coupled through the windings 226 of a relay 228 (see FIG. 2) to terminal 38. A flyback diode, such as a type 1N4004 is coupled across windings 226. Current flow through windings 226 closes switch 64. The output terminal of NAND gate 222 is also coupled to an input terminal of a NAND gate 230. The output terminal of NAND gate 230 provides the system's ON signal (which is logic "false" when high voltage is available across terminals 114, 120 in FIG. 3a). The output terminal of NAND gate 230 is coupled to both input terminals of a NAND gate 232 in inverter configuration. The output terminal of NAND gate 232 is coupled to an input terminal of a NAND gate 234, the output terminal of which is coupled through a 3.9K resistor to the base of transistor 198.

Gates 222, 230, 232 and 234 illustratively are a National Semiconductor type 74LS00 quad NAND gate integrated circuit.

The output terminal of NAND gate 230 is coupled to an input terminal, pin 1, of a dual monostable multivibrator integrated circuit 235 such as a Texas Instruments type 74123 integrated circuit. Pins 2 and 3 of integrated circuit 235 are coupled through a 4.7K resistor to the +5 VDC terminal. Pin 4 of circuit 235 is coupled to the remaining input terminal of NAND gate 234. Pin 8 of circuit 235 is coupled to ground. Pin 14 of circuit 235 is coupled through a series 220 uF capacitor 237 and 47K resistor 239 to the +5 VDC terminal. The junction of capacitor 237 and resistor 239 and is coupled through a diode to pin 15 of circuit 235. Pin 16 of circuit 235 is coupled to the +5 VDC terminal.

The output terminal of amplifier 196 is coupled to pin 2 of a dual monostable multivibrator integrated circuit 236 such as a Texas Instruments type 74123 integrated circuit. Pin 2 is coupled to ground through a 0.01 uF capacitor. Pins 1 and 8 of circuit 236 are coupled to ground. Pin 3 is coupled through a 4.7K resistor to the +5 VDC supply. Pin 4 of circuit 236 is coupled to the remaining input terminal of NAND gate 230. Pins 5 and 9 of circuit 236 are joined. Pin 6 is coupled through a series 470 uF capacitor 240 and 47K resistor 242 to the +5 VDC supply. The junction of capacitor 240 and resistor 242 is coupled through a diode to pin 7 of circuit 236. Pins 10 and 13 of circuit 236 are joined. Pin 11 of circuit 236 is coupled through a 4.7K resistor to the +5 VDC terminal. Pin 14 of circuit 236 is coupled through the series combination of a 68 uF capacitor 244 and a 47K resistor 246 to the +5 VDC terminal. The junction of capacitor 244 and resistor 246 is coupled through a diode to pin 15 of circuit 236. Pin 16 is coupled to the +5 VDC terminal.

Pins 10 and 13 of circuit 236 are also coupled to pin 1 of a counter integrated circuit 252 such as the National Semiconductor type 7490A counter integrated circuit. Pin 12 of circuit 236 is coupled to pins 2 and 3 of circuit 252. Pin 5 of circuit 252 is coupled to the +5 VDC terminal. Pins 6, 7 and 10 of circuit 252 are coupled to ground. Pins 11 and 14 of circuit 252 are coupled through a 2.2K resistor to the gate of an SCR 254. The gate of SCR 254 is coupled through a 1K resistor to terminal 40. Its cathode is coupled to terminal 40. Its anode is coupled through windings 214 (see FIG. 2) to terminal 38.

The output terminal of amplifier 136 is coupled to the +input terminal of a buffer and level adjusting difference amplifier 266. The output terminal of amplifier 266 is coupled through the series combination of a 20K potentiometer 268 and a 10K resistor 270 to ground. The common terminal of potentiometer 268 and resistor 270 is coupled to the −input terminal of amplifier 266. The output terminal of amplifier 266 is coupled through a 10K resistor to a KV meter (not shown) on the front panel of the system. Amplifiers 136, 266 illustratively are a National Semiconductor type LF442 integrated circuit.

In operation, the output high voltage across terminals 114, 120 is generated by width modulated pulses supplied by circuit 140 to the series regulator FET 56. Modulation of the width of the drive pulses at the gate of FET 56 controls the DC voltage level at the center tap 66 of the primary winding 70 of transformer 72. This controlled voltage level, alternately switched through the two halves of the primary winding 70 by FETs 88, 90 under the control of oscillator circuit 104, induces voltage variations in the secondary winding 112 of transformer 72. The magnitude of these variations, and thus the magnitude of the high magnitude potential across terminals 114, 120, is directly related to the voltage across the center tap 66 to ground.

The switching rate of oscillator circuit 104 is nominally approximately 12 KHz, but can be shifted downward by adding resistance through the 20K potentiometer between pins 2 and 3 of circuit 104.

Overcurrent protection of the series regulator including FET 56 is provided by a signal fed back from resistor 60 across pins 4 and 5 of pulse width modulator circuit 140. This series regulator output current is adjustable through potentiometer 150.

The output high voltage feedback loop is closed by amplifier circuit 135 which includes an input low-pass filter having a corner frequency in the range of about 480 Hz and a gain of approximately 2.

The output current of high voltage multiplier 110 is controlled through parallel control stategies. The three-pole active low-pass filter 160 effectively removes from the output current-related signal across resistor 124 all frequencies above about 250 Hz. That signal is then high-pass filtered by a filter on the input of amplifier 184, the filter having a corner frequency of about 90 Hz. A passband of corona discharge "intelligence" between about 90 Hz and about 250 Hz results. The low-pass filtered output signal from amplifier 168 is band-pass filtered between DC and a very low frequency established by the feedback circuit around amplifier 192. The output signal from amplifier 192, which is very slow variations in the current supplied by high voltage multiplier 110, is combined at junction 188 with the bandpass filtered corona information in the output signal from amplifier 184. This sum signal, buffered by amplifier 190, is supplied to comparator 196. In comparator 196, the signal's leading and trailing edges are sharpened during the strobe intervals when transistor 198 is off. Comparator 196 output signals indicative of impending corona discharges produce signals on pin 2 of circuit 236. Pin 4 of circuit 236 produces a signal in response. The duration of the signal on pin 4 is established by capacitor 244 and resistor 246 and is approximately 20 seconds. This signal controls the logic including gates 222, 230, 232 and 234, which controls the supply of potential to the center tap 66 by controlling the signal on pin 10 of the pulse width modulator circuit 140.

The counter 252 counts the pulses which appear on pins 10 and 13 of circuit 236. Counter 252 is configured to count up to five such pulses. If fewer than five such pulses are received before circuit 236 generates a reset pulse at pin 4 of circuit 236 and pins 2 and 3 of counter 252, counter 252 is reset. Otherwise pins 11 and 14 of counter 252 become high, energizing SCR 254 and removing the voltage from the center tap 66 of the primary winding 70 of transformer 72. The timing of the resetting pulses to pins 2 and 3 of counter 252 is determined by the values of capacitor 240 and resistor 242.

A parallel strategy for control of the output current from multiplier 110 is the so-called "static overload" control strategy. This strategy is implemented through amplifiers 168 and 202. A low pass filter on the +input terminal of amplifier 202 permits the static overload amplifier 202 to monitor essentially the full passband of the three-pole active filter 160. If the multiplier output current rises above an established level set by the potentiometer (not shown) on the −input terminal of amplifier 202, the available current at the output terminal of amplifier 202 is sufficient to trigger SCR 210, removing the voltage from the center tap 66 of primary winding 70 of transformer 72.

The system of this invention avoids the high voltage cable and its attendant capacity to store energy. Thus, this stored energy does not have to be dissipated in the event a corona "signature" indicative of an incipient spark is detected. This minimization of stored energy also permits discharging to be conducted through the high impedance high voltage- and return current-sensing path including resistors 130, 132 and 124 in the event of an incipient spark. The large, expensive mechanical shorting switches of prior art systems are thereby avoided.

In order to keep the stored energy to a minimum, it is desired that one supply according to the present invention be provided for each dispensing device 118. However, because of the small size of the system of the present invention, the system can be mounted on the support or drive mechanism for the dispensing device 118 itself. This simplifies the installation of a power supply according to the invention. It also further enhances the reduction of energy storage capacity by reducing the length of any conductor between output terminal 114 and terminal 116 on dispensing device 118.

The system of the present invention, although a "stiff" (i.e., non-resistive) electrostatic high potential supply, has a "soft turn-off" characteristic. That is, until the counter 252 has reached its full count without being reset, each time the corona signature of an incipient spark is detected, switch 64 opens, regulator 140 turns off the supply of potential across capacitor 77, capacitor 77 discharges fairly rapidly and capacitors $C_1$–$C_n$ discharge rapidly through resistors 130, 132 and 124. This turn-off is "soft" because it only lasts for a short time after which operating conditions return. If additional corona signatures indicative of incipient spark continue to be detected however, up to the full count of counter 252, regulator 140 and these other components continue to execute this discharging cycle. If counter 252 reaches its full count and the cause of the corona signature indicative of incipient spark has not been cleared or corrected, the system must then be manually reset.

What is claimed is:

1. In combination, a high magnitude electrostatic potential supply, an electrostatic potential utilization device, and means for coupling the electrostatic potential supply to the utilization device, the coupling means consisting essentially of a conductor having substantially no distributed capacitance and substantially no distributed resistance, the electrostatic potential supply comprises an operating potential source, a transformer having a primary winding and a secondary winding, a high potential rectifier and multiplier, means for coupling the operating potential source to the primary winding and means for coupling the secondary winding to the high voltage rectifier and multiplier, and the means for coupling the electrostatic potential supply to the utilization device consists essentially of the conductor for coupling the high potential rectifier and multiplier to the utilization device, the means for coupling the operating potential source to the primary winding comprises a regulator for providing regulated operating voltage and means for switching the regulated operating voltage across the primary winding, a resistive voltage divider, means for coupling the resistive voltage divider across the high potential rectifier and multiplier, and means for coupling a portion of the resistive voltage divider to the regulator, current sensing means and means for coupling the current sensing means in series with the regulator.

2. The combination of claim 1 wherein the utilization device comprises a device for dispensing coating material.

3. The combination of claim 2 wherein the coating material is a liquid and the dispensing device further comprises means for atomizing the coating material.

4. The combination of claim 1 and further comprising second current sensing means, the second current sensing means comprising a portion of the resistive voltage divider.

5. In combination, a high magnitude electrostatic potential supply, an electrostatic potential utilization device, and means for coupling the electrostatic potential supply to the utilization device, the coupling means consisting essentially of a discrete number of lumped resistors and a discrete number of conductors for connecting the resistors together in a network, and for conecting the network to the electrostatic potential supply and to the utilization device, the electrostatic potential supply comprises an operating potential source, a transformer having a primary winding and a secondary winding, a high potential rectifier and multiplier, means for coupling the operating potential source to the primary winding and means for coupling the secondary winding to the high voltage rectifier and multiplier, and the means for coupling the electrostatic potential supply to the utilization device consists essentially of the discrete number of lumped resistors and the discrete number of conductors for coupling the high potential rectifier and multiplier to the utilization device, the means for coupling the operating potential source to the primary winding comprises a regulator for providing regulated operating voltage and means for switching the regulated operating voltage across the primary winding, a resitive voltage divider, means for coupling the resistive voltage divider across the high potential rectifier and multiplier, and means for coupling a portion of the resistive voltage divider to the regulator, current sensing means and means for coupling the current sensing means in series with the regulator.

6. The combination of claim 5 and further comprising second current sensing means, the second current sensing means comprising a portion of the resistive voltage divider, a bandpass filter, means for coupling the second current sensing means to the bandpass filter, signal processing circuitry, means for coupling the bandpass filter to the signal processing circuitry, and means for coupling the signal processing circuitry to the operating potential source.

7. The combination of claim 5 wherein the utilization device comprises a device for dispensing coating material.

8. The combination of claim 7 wherein the coating material is a liquid and the dispensing device further comprises means for atomizing the coating material.

9. The combination of claim 5 wherein the conductors connect the resistors together in a series string of resistors and connect the series string between the high potential supply and the utilization device.

10. In combination, a high magnitude electrostatic potential supply, an electrostatic potential utilization device and means for coupling the supply to the utilization device, the electrostatic potential supply including a source of operating potential, means for generating high magnitude electrostatic potential from the operating potential, means for coupling the operating potential source to the high magnitude electrostatic potential generator, means for sensing the output current from the electrostatic potential supply, means for coupling the current sensing means to the electrostatic potential supply, a bandpass filter, means for coupling the current sensing means to the bandpass filter, signal processing means, means for coupling the bandpass filter to the signal processing means, and means for coupling the signal processing means to the operating potential source.

11. The combination of claim 10 wherein the means for generating high magnitude electrostatic potential comprises a pair of output terminals and the output current sensing means comprises a resistive voltage divider and means for coupling the voltage divider across the output terminals, the output current being sensed across a portion of the resistive voltage divider.

12. The combination of claim 11 wherein the means for coupling the supply to the utilization device consists essentially of a discrete number of lumped resistors and a discrete number of conductors for connecting the resistors together in a network, and for connecting the network to the electrostatic potential supply and to the utilization device.

13. The combination of claim 12 wherein the conductors connect the resistors together in a series string of resistors and connect the series string between the high potential supply and the utilization device.

14. The combination of claim 10 wherein the means for coupling the supply to the utilization device consists essentially of a discrete number of lumped resistors and a discrete number of conductors for connecting the resistors together in a network, and for connecting the network to the electrostatic potential supply and to the utilization device.

15. The combination of claim 14 wherein the conductors connect the resistors together in a series string of resistors and connect the series string between the high potential supply and the utilization device.

16. In combination, a high magnitude electrostatic potential supply including a pair of output terminals across which high magnitude electrostatic potential is supplied, an electrostatic potential utilization device, means for coupling the utilization device to one of the terminals, at least one discrete resistor, and means for coupling the at least one discrete resistor across the terminals to provide a current flow between the terminals through the at least one discrete resistor, the current flow tending to reduce the high magnitude electrostatic potential across the pair of output terminals, the means for coupling the utilization device to one of the terminals consisting essentially of a conductor having substantially no distributed capacitance and substantially no distributed resistance, the electrostatic potential supply comprising an operating potential source, a transformer having a primary winding and a secondary winding, a high potential rectifier and multiplier, means for coupling the operating potential souorce to the primary winding and means for coupling the secondary winding to the high voltage rectifier and multiplier, and the means for coupling the electrostatic potential supply to the utilization device consisting essentially of the conductor for coupling the high potential rectifier and multiplier to the utilization device, the means for coupling the operating potential source to the primary winding comprises a regulator for providing regulated operating voltage and means for switching the regulated operating voltage across the primary winding.

17. The combination of claim 16 wherein the utilization device comprises a device for dispensing coating material.

18. The combination of claim 17 wherein the coating material is a liquid and the dispensing device further comprises means for atomizing the coating material.

19. The combination of claim 16 wherein the at least one discrete resistor comprises a resistive voltage divider across the terminals, and means for coupling a portion of the resistive voltage divider to the regulator.

20. The combination of claim 19 and further comprising current sensing means and means for coupling the current sensing means in series with the regulator, the current sensing means feeding back regulator current flow information to the regulator.

21. The combination of claim 20 and further comprising second current sensing means, the second current sensing means comprising a portion of the resistive voltage divider, and means for coupling the second current sensing means to the regulator to provide high potential rectifier and multiplier output current information to the regulator.

22. The combination of claim 19 and further comprising current sensing means, the current sensing means comprising a portion of the resistive voltage divider, a bandpass filter, means for coupling the current sensing means to the bandpass filter, signal processing circuitry, means for coupling the signal processing circuitry to the bandpass filter, and means for coupling the signal processing circuitry to the operating potential source.

23. In combination, a high magnitude electrostatic potential supply including a pair of output terminals across which high magnitude electrostatic potential is supplied, an electrostatic potential utilization device, means for coupling the utilization device to one of the terminals, at least one discrete resistor, and means for coupling the at least one discrete resistor across the terminals to provide a current flow between the terminals through the at least one discrete resistor, the current flow tending to reduce the high magnitude electrostatic potential across the pair of output terminals, the means for coupling the utilization device to one of the terminals consisting essentially of at least one discrete, lumped resistor and at least one conductor having substantially no distributed capacitance and substantially no distributed resistance, the electrostatic potential supply comprises an operating potential souorce, a transformer having a primary winding and a secondary winding, a high potential rectifier and multiplier, means for coupling the operating potential source to the primary winding and means for coupling the secondary winding to the high voltage rectifier and multiplier, and the means for coupling the electrostatic potential supply to the utilization device consists essentially of the at least one discrete lumped resistor and the at least one conductor having substantially no distributed capacitance and substantially no distributed resistance for coupling the high potential rectifier and multiplier to the utilization device, the means for coupling the operating potential source to the primary winding comprises a regulator for providing regulated operating voltage and means for switching the regulated operating voltage across the primary winding, the at least one discrete resistor comprises a resistive voltage divider across the terminals, and means for coupling a portion of the resistive voltage divider to the regulator, current sensing means and means for coupling the current sensing means in series with the regulator, the current sensing means feeding back regulator current flow information to the regulator.

24. The combination of claim 23 wherein the utilization device comprises a device for dispensing coating material.

25. The combination of claim 24 wherein the coating material is a liquid and the dispensing device further comprises means for atomizing the coating material.

26. The combination of claim 23 and further comprising second current sensing means, the second current sensing means comprising a portion of the resistive voltage divider, and means for coupling the second current sensing means to the regulator to provide high potential rectifier and multiplier output current information to the regulator.

27. In combination, a high magnitude electrostatic potential supply, an electrostatic potential utilization device, and means for coupling the electrostatic potential supply to the utilization device, the coupling means consisting essentially of a conductor having substantially no distributed capacitance and substantially no distributed resistance, the electrostatic potential supply comprises an operating potential source, a transformer having a primary winding and a secondary winding, a high potential rectifier and multiplier, means for coupling the operating potential source to the primary winding and means for coupling the secondary winding to the high voltage rectifier and multiplier, and the means for coupling the electrostatic potential supply to the utilization device consists essentially of the conductor for coupling the high potential rectifier and multiplier to the utilization device, the means for coupling the operating potential source to the primary winding comprises a regulator for providing regulated operating voltage and means for switching the regulated operating voltage across the primary winding, a resistive voltage divider, means for coupling the resistive voltage divider across the high potential rectifier and multiplier, and means for coupling a portion of the resistive voltage divider to the regulator, current sensing means, the current sensing means comprising a portion of the resistive voltage divider, a bandpass filter, means for coupling the current sensing means to the bandpass filter, signal processing circuitry, means for coupling the bandpass filter to the signal processing circuitry, and means for coupling the signal processing circuitry to the operating potential source.

28. The combination of claim 27 wherein the utilization device comprises a device for dispensing coating material.

29. The combination of claim 28 wherein the coating material is a liquid and the dispensing device further comprises means for atomizing the coating material.

30. In combination, a high magnitude electrostatic potential supply, an electrostatic potential utilization device, and means for coupling the electrostatic potential supply to the utilization device, the coupling means consisting essentially of a discrete number of lumped resistors and a discrete number of conductors for connecting the resistors together in a network, and for connecting the network to the electrostatic potential supply and to the utilization device, the electrostatic potential supply comprises an operating potential source, a transformer having a primary winding and a secondary winding, a high potential rectifier and multiplier, means for coupling the operating potential source to the primary winding and means for coupling the secondary winding to the high voltage rectifier and multiplier, and the means for coupling the electrostatic potential supply to the utilization device consists essentially of the discrete number of lumped resistors and the discrete number of conductors for coupling the high potential rectifier and multiplier to the utilization device, the means for coupling the operating potential source to the primary winding comprises a regulator for providing regulated operating voltage and means for switching the regulated operating voltage across the primary winding, a resistive voltage divider, means for coupling the resistive voltage divider across the high potential rectifier and multiplier, and means for coupling a portion of the resistive voltage divider to the regulator, current sensing means, the current sensing means comprising a portion of the resistive voltage divider, a bandpass filter, means for coupling the current sensing means to the bandpass filter, signal processing circuitry, means for coupling the bandpass filter to the signal processing circuitry, and means for coupling the signal processing circuitry to the operating potential source.

31. The combination of claim 30 wherein the utilization device comprises a device for dispensing coating material.

32. The combination of claim 31 wherein the coating material is a liquid and the dispensing device further comprises means for atomizing the coating material.

33. The combination of claim 30 wherein the conductors connect the resistors together in a series string of resistors and connect the series string between the high potential supply and the utilization device.

34. In combination, a high magnitude electrostatic potential supply including a pair of output terminals across which high magnitude electrostatic potential is supplied, an electrostatic potential utilization device, means for coupling the utilization device to one of the terminals, at least one discrete resistor, and means for coupling the at least one discrete resistor across the terminals to provide a current flow between the terminals through the at least one discrete resistor, the current flow tending to reduce the high magnitude electrostatic potential across the pair of output terminals, the means for coupling the utilization device to one of the terminals consisting essentially of at least one discrete, lumped resistor and at least one conductor having substantially no distributed capacitance and substantially no distributed resistance, the electrostatic potential supply comprises an operating potential source, a transformer having a primary winding and a second winding, a high potential rectifier and multiplier, means for coupling the operating potential source to the primary winding and means for coupling the secondary winding to the high voltage rectifier and multiplier, and the means for coupling the electrostatic potential supply to the utilization device consists essentially of the at least one discrete lumped resistor and the at least one conductor having substantially no distributed capacitance and substantially no distributed resistance for coupling the high potential rectifier and multiplier to the utilization device, the means for coupling the operating potential source to the primary winding comprises a regulator for providing regulated operating voltage and means for switching the regulated operating voltage across the primary winding, the at least one discrete resistor comprises a resistive voltage divider across the terminals, and means for coupling a portion of the resistive voltage divider to the regulator, current sensing means, the current sensing means comprising a portion of the resistive voltage divider, a bandpass filter, means for coupling the current sensing means to the bandpass filter, signal processing circuitry, means for coupling the bandpass filter to the signal processing circuitry, and means for coupling the signal processing circuitry to the operating potential source.

35. The combination of claim 34 wherein the utilization device comprises a device for dispensing coating material.

36. The combination of claim 35 wherein the coating material is a liquid and the dispensing device further comprises means for atomizing the coating material.

* * * * *

UNITED STATES PATENT AND TRADEMARK OFFICE
CERTIFICATE OF CORRECTION

PATENT NO. : 4,745,520

DATED : May 17, 1988

INVENTOR(S) : Daniel C. Hughey

It is certified that error appears in the above-identified patent and that said Letters Patent is hereby corrected as shown below:

At column 12, line 46, please delete "combintion" and insert therefor --combination--;

At column 13, line 39, please delete "resitive" and insert therefor --resistive--; and At column 18, line 10, please delete "second" and insert therefor --secondary--.

Signed and Sealed this

First Day of November, 1988

Attest:

DONALD J. QUIGG

*Attesting Officer*

*Commissioner of Patents and Trademarks*